(12) United States Patent
Martin (10) Patent No.: US 7,284,421 B2
(45) Date of Patent: Oct. 23, 2007

(54) DETECTION OF WAKE VORTICES AND THE LIKE IN THE LOWER ATMOSPHERE

(75) Inventor: Andrew Louis Martin, Victoria (AU)

(73) Assignee: Tele-IP Limited, Victoria (AU)

( * ) Notice: Subject to any disclaimer, the term of this patent is extended or adjusted under 35 U.S.C. 154(b) by 0 days.

(21) Appl. No.: 10/568,202

(22) PCT Filed: Aug. 11, 2004

(86) PCT No.: PCT/AU2004/001075

§ 371 (c)(1),
(2), (4) Date: Jul. 11, 2006

(87) PCT Pub. No.: WO2005/015259

PCT Pub. Date: Feb. 17, 2005

(65) Prior Publication Data

US 2007/0089502 A1    Apr. 26, 2007

(30) Foreign Application Priority Data

Aug. 11, 2003    (AU) .............................. 2003904198

(51) Int. Cl.
*G01F 1/66* (2006.01)

(52) U.S. Cl. ............................... 73/170.13; 73/170.16; 73/170.01

(58) Field of Classification Search ............. 73/170.13, 73/170.01, 170.16
See application file for complete search history.

(56) References Cited

U.S. PATENT DOCUMENTS

| 3,893,060 | A |   | 7/1975 | Balser |
| 4,158,401 | A | * | 6/1979 | Matsumoto et al. ........ 181/210 |
| 4,831,874 | A | * | 5/1989 | Daubin et al. ................ 73/489 |
| 5,142,504 | A | * | 8/1992 | Koster et al. ............ 379/88.16 |
| 6,987,707 | B2 | * | 1/2006 | Feintuch et al. .............. 367/99 |

* cited by examiner

*Primary Examiner*—Andre J. Allen
(74) *Attorney, Agent, or Firm*—Hovey Williams LLP (57) ABSTRACT

Two SODAR systems (12a and 12r) for detecting and characterizing vortices (16) shed from landing or departing aircraft (14) as at an airport (10) are positioned so that one, the active system (12a) is located beneath the likely vortices (16) and the other, the reference system (12r) is located away from the vortices but in the same ambient environment. Thus, where a wind duct or thermal inversion (18) is present, both SODAR systems will detect echoes (22 and 28) generated thereby, whereas only the active system (12a) will detect echoes (24) from wake vortices (16). By differencing the outputs of the reference and active systems, better vortex identification and discrimination is achieved. Only one SODAR system need be used where sufficiently normal conditions prevail between aircraft activity, since readings taken in the absence of aircraft can be used as reference data for subtraction from 'active' data recorded during the presence of aircraft.

19 Claims, 8 Drawing Sheets

DETECTION OF WAKE VORTICES AND THE LIKE IN THE LOWER ATMOSPHERE

TECHNICAL FIELD

The present invention is generally concerned with SODAR apparatus, methods and systems for use in detecting, recording and/or displaying short-duration or anomalous atmospheric turbulence such as wake vortices shed from large aircraft, large wind-generator propellers or the like, and such as occasional down-wind vortices or turbulence generated by tall man-made or natural structures in a prevailing wind. The invention is well suited to the detection and/or display of aircraft wake vortices in the vicinity of major airports to augment airport safety and traffic management.

In other words, the type of turbulence with which this invention is typically concerned is that which occurs in calm, or relatively mild or constant weather conditions and is not amenable to prediction by weather forecasting techniques. Indeed, the vortices of concern seldom form and very rarely persist in gusty or stormy conditions where there is high atmospheric mixing. The energy of any vortex that does form under these conditions tends to be quickly dissipated.

BACKGROUND TO THE INVENTION

This specification is to be read in conjunction with our prior international applications PCT/AU01/00247, PCT/AU02/01129, PCT/AU04/00242 relating to SODAR systems using long pulses encoded in a 'pulse compression' manner, using over-sampling of received echoes for good resolution and processing gain, and using complex Fourier-domain processing of the sampled echoes to achieve further discrimination and processing gains in the signal-to-noise ratio. The pulses—generically called 'chirps'—employed in our prior inventions preferably had durations in the order of tens of seconds. The pulse-compression technique employed was preferably a linear increase or decrease in phase (tone) over the duration of the pulse; for example, a steady increase in tone from 500 to 1500 Hz, or a steady decrease in tone from 1500 to 500 Hz. The methods disclosed involved 'listening while sending'; that is, echoes are received and processed while transmission of the chirp is still under way. This technique not only allows very high system and processing gains that result in exceptionally good s/n (signal to noise ratio), but it also enables atmospheric discontinuities that occur close to the ground to be detected. Since prior art systems could not 'listen while sending', it was necessary to use short powerful pulses for short-ranges and to suffer the resulting very poor system and processing gains. Such prior art SODARs were essentially incapable of detecting and displaying wake vortices with the high spatial and temporal necessary for charactreising the vortices in a wide range of airport environments.

While the SODAR systems disclosed in our prior applications were capable of detecting wake vortices and of monitoring wind conditions in the vicinity of airports with much greater sensitivity and precision than was previously possible in the art, they still had difficulty in displaying the 'life' of a vortex; for example, tracking the wind shear disturbances formed by a landing aircraft as they form, fade, travel to the ground or dissipate over a period of seconds or minutes.

For brevity, the disclosures in our aforementioned applications are regarded as being incorporated herein, including the extensive discussion of the prior art contained in the specifications of those applications. In addition, some of the terminology that is used herein is explained or defined in those specifications.

OUTLINE OF THE INVENTION

The present invention is based upon the realization that the short-term anomalous atmospheric turbulence of interest (herein called the 'target turbulence') is difficult to reliably detect, isolate and display by SODAR methods because it is embedded in ambient, 'normal' or prevailing atmospheric discontinuities of little intrinsic interest, despite the fact that such discontinuities may include wind-generated (non-target) turbulence. Thus, from one aspect, a method of the invention involves detecting or characterizing the target turbulence embedded within the prevailing conditions and separately detecting or characterizing the prevailing conditions in the absence of the target turbulence, then differencing the two results to generate an output that is indicative of the target disturbance with the prevailing conditions absent or at least reduced.

For the sake of convenience, the target turbulence of interest may also be referred herein as a 'vortex' or 'vortices'. The system datasets or signals generated in vortex conditions may be called the 'active' datasets or signals, those generated under prevailing conditions may be called the 'reference' datasets or signals, while the output generated by differencing the active and reference datasets or signals may be called the 'net' dataset, signal or output.

The reference and active outputs are preferably generated either by the same SODAR system at different times or by substantially identical SODAR systems at different locations that have common prevailing conditions. This will ensure that minimum system-dependent differences affect the comparison or differencing of the active and reference data or signals.

Some means of automatically detecting the presence of the target turbulence may be employed so that the active and reference outputs can be generated at the appropriate times and/or places. This can be done in a variety of ways. The SODAR system itself can be used to detect the presence of local wind velocity, wind shear or the like parameter that exceeds a preset threshold of intensity and that is within a predetermined distance range. This method is suitable where the distance range is of the order of kilometers or where the target turbulence is substantial—for example, a 'dust devil' or tornado—and is comparatively infrequent or rare. Where low altitude aircraft wake vortices in the vicinity of airports are of interest, normal conditions can be assumed to preside prior to the approach of an aircraft, some minutes after the last aircraft landing or at some distance from the approach/takeoff path that has been used. This is because wake vortices are of generally short duration (usually of the order of seconds but occasionally of the order of minutes). Thus, normal and vortex turbulence measurements can be initiated manually or automatically using visual and/or audible cues dependent upon the approach or departure of aircraft at a given runway.

Where vortices from wind generators are of interest (and are assumed to be shed continuously) the reference signal can be generated by using a second reference SODAR system located sufficiently far from the generator that it is clear of its vortices but not so far away as to have different prevailing conditions.

The atmospheric parameter(s) used by the SODAR system to identify the presence of a disturbance of interest need not be the same as that or those used to generate the normal, reference and vortex signals or displays. For example, detection of vertical wind speed above a predetermined threshold may be used to trigger the switch from normal/reference to turbulence signal generation, but the parameters that make up the reference and turbulence signals may include horizontal wind shear, wind velocity, virtual temperature, refractive index etc, with or without the inclusion of the vertical wind speed parameter. Similarly, the generation of the vortex signal from a comparison of the normal and reference signals may involve comparison of all component parameters of each signal, or comparison of only selected parameters.

Our prior international patent applications disclosed SODAR methods and apparatus for deriving atmospheric parameters using long chirps (in excess of 100 ms) and using the novel technique of 'listening during sending' to greatly increase processing gain with respect to maximum transmitter power. Such techniques require the use of matched filters referencing the transmitted chirp waveform to extract phase and amplitude information within the returned echoes. The matched filters preferred are those that use Fourier methods and effect the filtering in the frequency rather than the time domain, though the latter is also envisaged here. The phase and/or amplitude datasets extracted from the active and reference returns are, preferably, either or both used in effecting the differencing referred to above.

In view of the short range involved in detecting aircraft vortices near airports, the invention, from another aspect, involves a system in which a fixed series of SODAR receivers is arranged across or along a flight-path, the volume of air above the receivers and near the receivers is illuminated by a SODAR transmitter and the outputs of the receivers are processed and combined as a synthetic aperture to generate a visual display of atmospheric vortices within the volume of air. Again, a comparison of reference and active synthetic aperture outputs is used to generate the desired vortex output.

Since the target turbulences will normally have a relatively short life will be relatively close, shorter chirps are herein preferred so as to allow frequent soundings to be made during the life of the target turbulence. We have found that interrogating chirps of between about 300 ms and 3 s are well suited to the detection of wake vortices within ranges of up to a few hundred meters. Thus, for a range of about 150 m, we use interrogating pulses of about 1.5 s and listening times of about 2.5 s (including most or all of the transmit time). For a range of about 300 m, we favor the use of chirps of about 1.5 s with listening times of about 3.5 s. The short transmit time is desirable in order to ensure that the rapidly changing vortex conditions can be detected and that the up-date cycle is short. Pulses much longer than about 2 s may not be able to resolve the vortices shed by wind turbines or aircraft adequately.

DESCRIPTION OF EXAMPLES

Having portrayed the nature of the present invention, particular examples will now be described with reference to the accompanying drawings. However, those skilled in the art will appreciate that many variations and modifications can be made to the chosen examples while conforming to the scope of the invention as outlined above.

BRIEF SUMMARY OF THE DRAWINGS

In the accompanying drawings:

FIGS. 6 (*a*), (*b*) and (*c*) are three plots of height (altitude) against cumulative phase for three points in the block diagram of FIG. 3.

FIGS. 7 (*a*), (*b*) and (*c*) are three plots of height (altitude) against amplitude for three points in the block diagram of FIG. 3.

The chosen examples relate to SODAR systems and techniques capable of detecting and displaying—in near real-time—wake vortices caused by large aircraft landing at an airport at altitudes of below 150 m. It is to be noted that prior art SODAR systems have been unable to detect and portray wake vortices at such low altitudes due to their relatively poor s/n (among other factors). Indeed, no prior art system—RADAR, LIDAR and RASS included—appears to have met this challenge.

Figure 1:
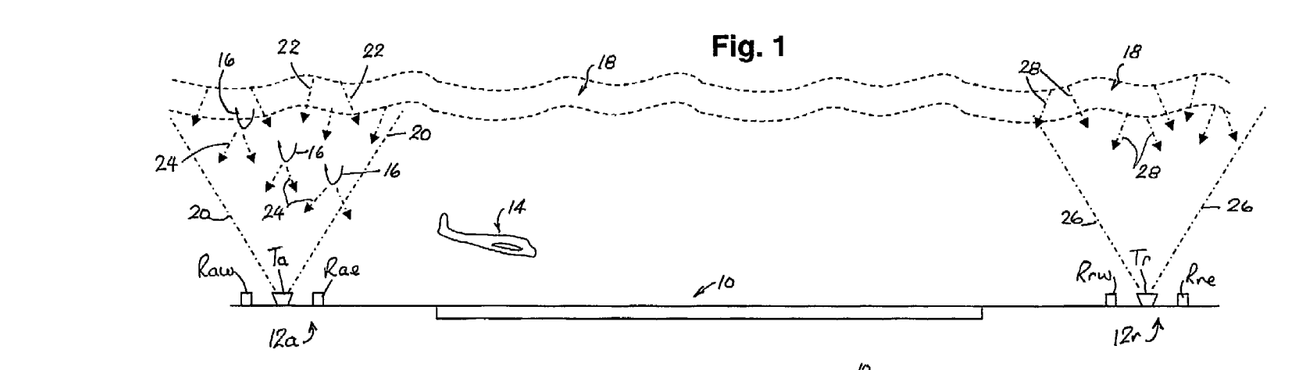
FIG. 1 is a diagram of an airport runway extending East-West, viewed from the side, with a SODAR system at each end for use in detecting and displaying vortices left by landing aircraft and/or aircraft taking off.

FIG. 1 is a diagram showing: an east-west aligned runway 10, a first SODAR system 12*a* located under the glide path at the west end of runway 10, a second identical SODAR system 12*r* located under the glide path at the east end of runway 10, an approaching aircraft 14, and trailing vortices 16 shed by aircraft 14. A wind shear duct 18 (indicated in broken lines) extends over the entire airport and contains some of vortices 16. In this example, system 12*a* serves as the active system (generating active data from vortices 16) and system 12*r* serves as the reference system (generating reference data from ambient conditions, including duct 18).

When aircraft land from east to west, the roles of SODAR systems 12*a* and 12*r* can be reversed. At a large and busy airport with a long runway, it may not be convenient or desirable to use system 12*r* to reference ambient conditions for system 12*a* (and vice versa) because the ambient conditions may not be substantially identical in both locations. In that case, systems 12*a* and 12*r* can be operated independently to generate their own reference data in quiet periods between aircraft landings. The depiction of a physically separate reference system is an illustrative convenience.

SODAR systems 12*a* and 12*r* are conveniently those disclosed in our prior applications in which four receivers are placed on the cardinal points of the compass close to a central transmitter and with their axes inclined slightly toward the vertical axis of the transmitter. A fifth vertically pointing receiver is also used to assist in determining vertical wind speed where there is a significant prevailing wind. On still days in the absence of wind, useful results can be obtained with large aircraft using only one receiver (preferably the vertical one). In FIG. 1, the transmitter of active system 12a is indicated at Ta and its east and west receivers are indicated at Rae and Raw, the three other receivers of active system 12a not being shown in this Figure. Similarly, reference system 12r has a transmitter Tr and five nearby receivers, with only the east and west receivers, Rre and Rrw, being shown in FIG. 1. The substantially vertical conical volume of air illuminated by transmitter Ta is indicated by dot-dash lines 20 and the echoes of a transmitted chirp back-scattered from duct 18 are indicated by arrows 22 and those back-scattered from vortices 16 being indicated by arrows 24. Both sets of echoes will normally be received by all receivers of system 12a, though those retuned to each receiver will differ slightly—but importantly—from one another.

The vortex detection and characterization systems of this example transmit a chirp of about 1.5 s in duration and have listening times of about 2.5 s, including the transmitted chirp duration. The 1.0 s listening time after the end of the transmitted chirp provides the desired range of about 150 m. It is convenient from the standpoint of control and programming to employ a simple linear chirp that rises from a tone of about 1000 Hz to about 2500 Hz. However, as taught in our prior applications many other waveforms may be employed so long as they are suited to pulse-compression using Fourier or time-domain methods.

Figure 2:
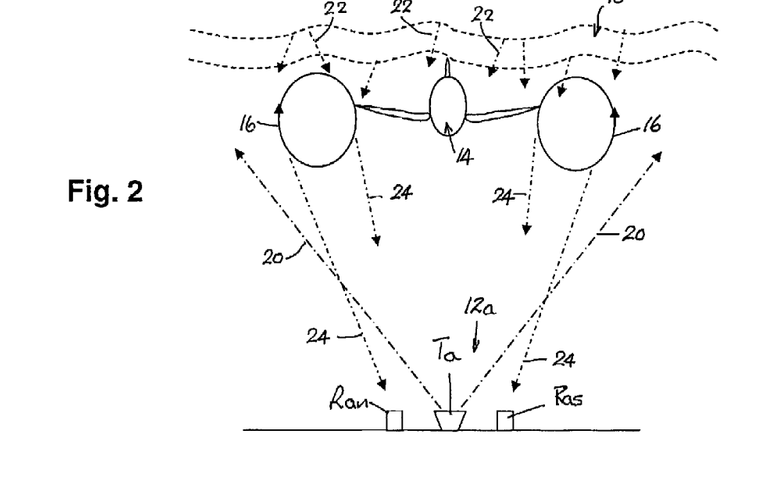
FIG. 2 is a diagram of the runway of FIG. 1, viewed from one end showing one of the SODAR systems and an aircraft generating wake vortices.

In FIG. 2, which is an end view from the west of the approaching aircraft 14, the north and south receivers Ran and Ras of active system 12a are shown along with vortices 16, duct 18 and their respective echoes 24 and 22.

In FIG. 1, the transmitter of reference SODAR system 12r is indicated at Tr and the east and west receivers are indicated at Rre and Rrw, the illuminated cone of Tr being indicated by dot-dash lines 26. The illuminated cone 26 includes wind-shear duct 18 that generates echo signals 28 of transmissions from transmitter Tr, which are returned to all receivers of system 12r. It is generally a safe assumption that, provided active and reference systems 12a and 12r are substantially identical, echo signals 19 and 26 will be nearly identical. Of course, ducts such as 18, along with their associated wind-shears, temperature gradients and inversions, are of genuine interest in their own right and the data collected by reference system 12r will form an important input to weather reporting and prediction at airport 10. This is a strong reason for employing at least four receivers arranged on the cardinal compass points around a single transmitter, as taught by our prior patent applications.

Figure 3:
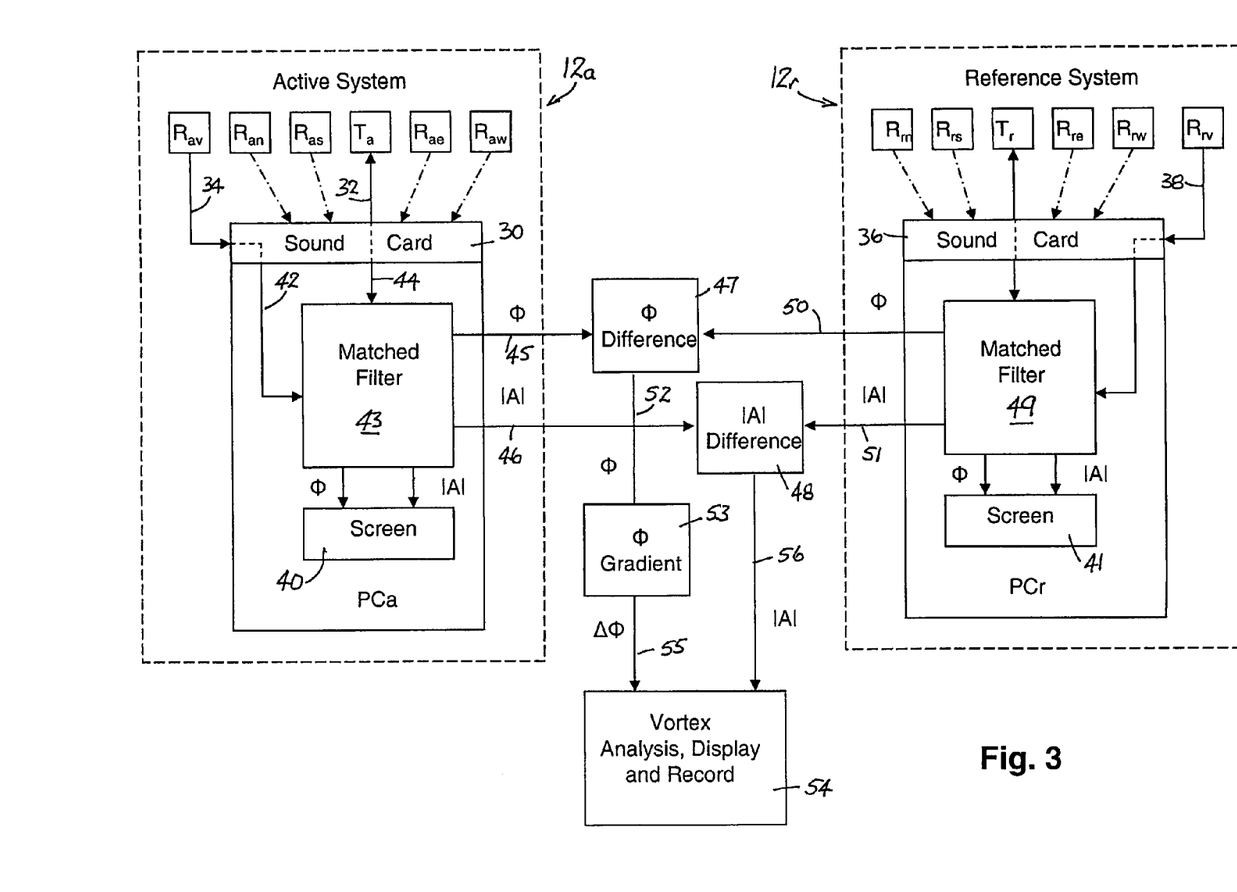
FIG. 3 is a block diagram showing the principal functional elements of the two SODAR systems of FIG. 1 and the manner in which a suitable output display is generated from the output of a single receiver in each system.

As will be seen from FIG. 3, each SODAR system 12a and 12r essentially comprises a computer, PCa and PCr (respectively), connected to the respective system transmitter and receivers. Active system 12a shows vertically oriented receiver—indicated at Rav—not shown in FIGS. 1 and 2. Similarly, reference system 12r is shown as including its north and south receivers, Rrn and Rrs, along with vertical receiver Rrv, which were not shown in FIG. 1. It is desirable that, if separate active and reference systems are employed, they be substantially identical so that phase and other delays, gains and frequency characteristics are well matched. This minimizes system-introduced error and inaccuracy.

Computer PCa of active system 12a is interfaced to its receivers and transmitter by a digital sound card 30 of known design that includes an analog output 32 for driving its transmitter Ta and five analog inputs for receiving the signals from its five receivers, only output 34 from vertical receiver Rav being accepted in this instance (as explained below). The receiver signals may be of digital or analog form and, if analog (as assumed here), the sound card of PCa will need to convert these signals to a sampled digital format. Similarly, computer PCr of reference system is interfaced to its transmitter and five receivers by its sound card 36, only analog input 38 from vertical receiver Rrv being accepted (as explained below). Computers PCa and PCr will normally include their own screens, 40 and 41, for displaying the data derived from its receivers in a graphical format, screen 40 of PCa displaying the data derived from the combined duct and vortex echoes (22 and 24 respectively) detected by receiver Rav and screen 41 of PCr displaying the data derived from echoes 28 of the duct alone detected by vertical receiver Rrv.

When a vortex 16 is being viewed from beneath using SODAR 12a, one 'sees' Doppler phase shifts indicative of both rapidly moving downward and rapidly moving upward air currents characteristic of wake vortices. For this purpose, it will generally be sufficient to use only the vertically pointing receiver Rav in active system 12a. Accordingly, if only vertical receiver Rav is used for vortex detection, only reference signals from vertical receiver Rrv will be of use in better characterizing a vortex 16. For this reason only the connection between receiver Rav and computer PCa, and only the connection between receiver Rrv and computer PCr, are shown solid lines in FIG. 3. The outputs of the other receivers can therefore be ignored in considering FIG. 3 but their use will be described with reference to FIG. 4.

Accordingly, the sound card 30 of computer PCa receives and digitizes the analog output 34 from vertical receiver Rav only and inputs the resultant digital sample stream on line 42 to a matched filter 43 implemented in computer PCa by reference to a digital sample stream of transmitter driver signal 32 input to filter 43 on line 44. The output of filter 43 comprises phase and amplitude data streams |A| and Φ on lines 45 and 46 that are fed to phase differencing unit or function 47 and amplitude differencing unit or function 48 (respectively). In exactly the same way, digitized sample streams from receiver Rrv and transmitter Tr are fed to a matched filter 49 and phase and amplitude outputs from filter 49 are fed on lines 50 and 51 to respective differencing units 47 and 48. The differenced output of phase unit 47 on line 52 is differentiated in unit or function 53 and the resulting gradient output [ΔΦ] is fed to a vortex analysis, display and record unit or function 54 on input line 55. The output of amplitude differencing unit 48 is similarly fed to unit 52 on line 56. The 'active' amplitude and phase outputs from matched filter 43 can be displayed on screen 40 of PCa and, similarly, the 'reference' amplitude and phase outputs of matched filter 49 can be displayed on screen 41 of PCr.

Figure 4:
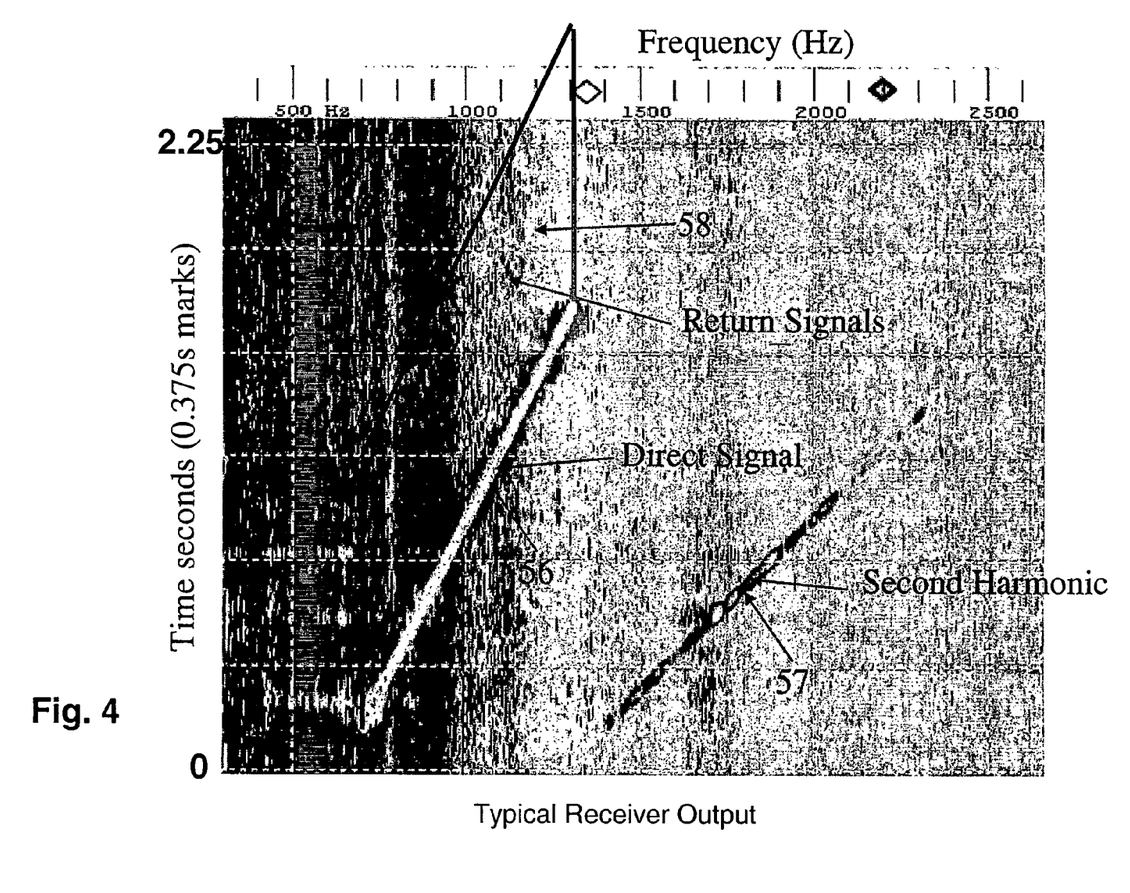
FIG. 4 is a time/frequency plot of the analog output of one receiver one of the SODAR systems of FIG. 1.

Turning now to FIGS. 4-7, which are plots of the signals at various points in FIG. 3, the graph of FIG. 4 is a time/frequency plot of the analog output of active vertical receiver Rav that was fed to sound card 30 on line 34 during operation of SODAR system 12a. The bold diagonal pale line 56 is the strong direct chirp signal that is conveyed horizontally directly between transmitter Ta and receiver Rav, despite the use of suitable acoustic shielding to minimize this 'direct signal'. It has a duration of 1.5 s. The darker blotchy line 57 is the second harmomic of the direct signal 56 which is also generated by transmitter Ta and directly conveyed to receiver Rav. The parallelogram 58 based on direct signal 56 indicates the echo information (along with the direct signal and noise) gathered during the total listening period of 2.5 s, using appropriate filters in receiver Rav. This information (and noise) is that which is sampled into a dataset of 240,000 digital samples by sound card 30 of computer PCa. No echo signals can be visually or aurally identified from the output of receiver Rav, such identification requires the use of matched filter techniques (known in the art and taught in our prior patent applications).

Figure 5:
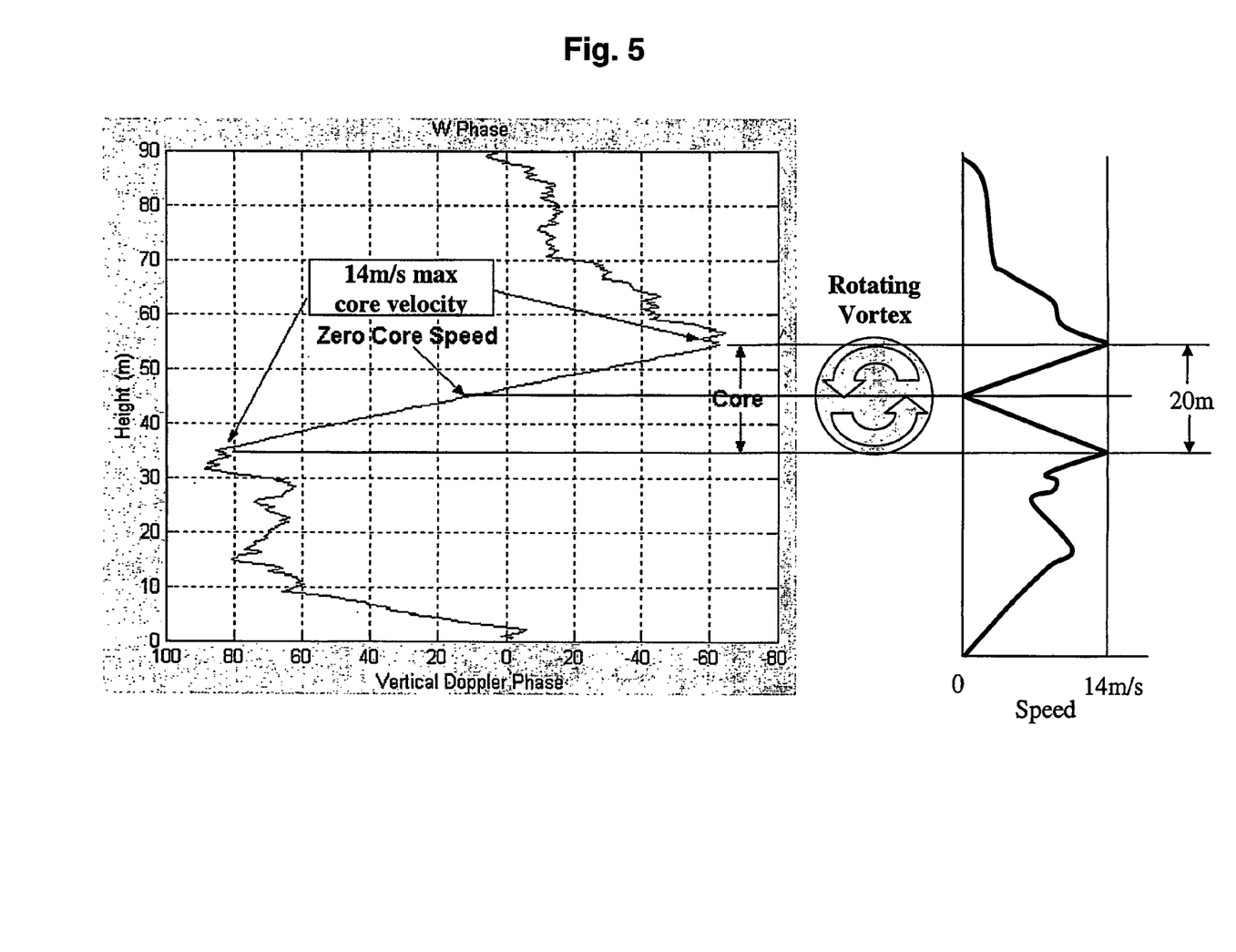
FIG. 5 is a plot of the cumulative phase (Doppler) output of a matched filter in one of the SODAR systems of FIG. 3, together with diagrams illustrating the vortex signified by that plot.

The graph of FIG. 5 is a plot of cumulative relative phase change (or Doppler shift on the horizontal axis) between successive samples output on line 45 of FIG. 3. Since the succession of samples is a proxy for height or altitude, this is indicated on the vertical axis rather than sample number. The plot was generated with the system of FIG. 3 from phase data output on line 45 from matched filter 43 of PCa without the need for differencing in unit 47 with reference phase data from PCr on line 50. As will be seen from FIG. 4, the phase plot indicates a rotating vortex of about 20 m in diameter with a maximum peripheral velocity of 14 m/s. This yields a circulation strength of about 880 $m^2/s$, which is unusually strong and would certainly flip a light aircraft entering the vortex. The data was obtained on an unusually still day at Melbourne airport from a Boeing 737 during the flare-out prior to landing and is exceptional.

Figure 6:
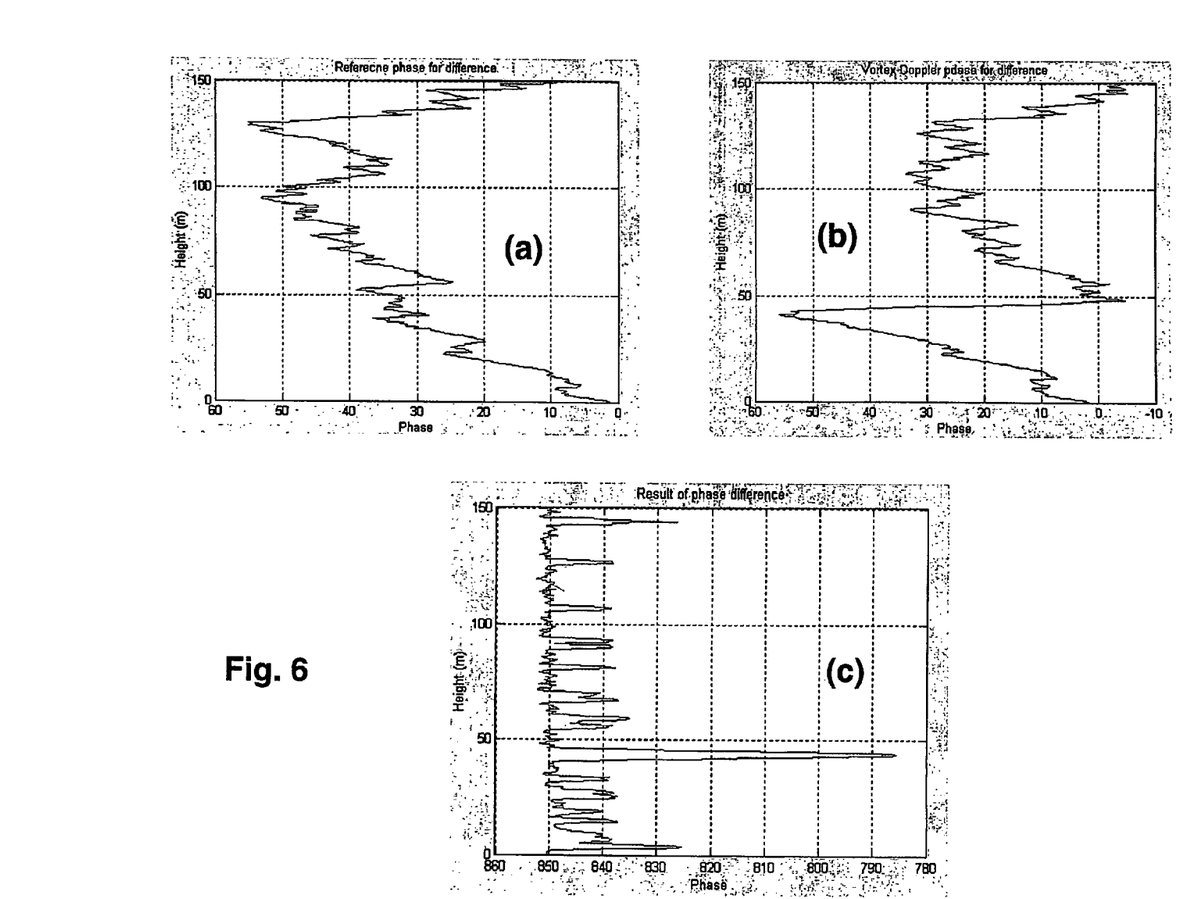
Figure 7:
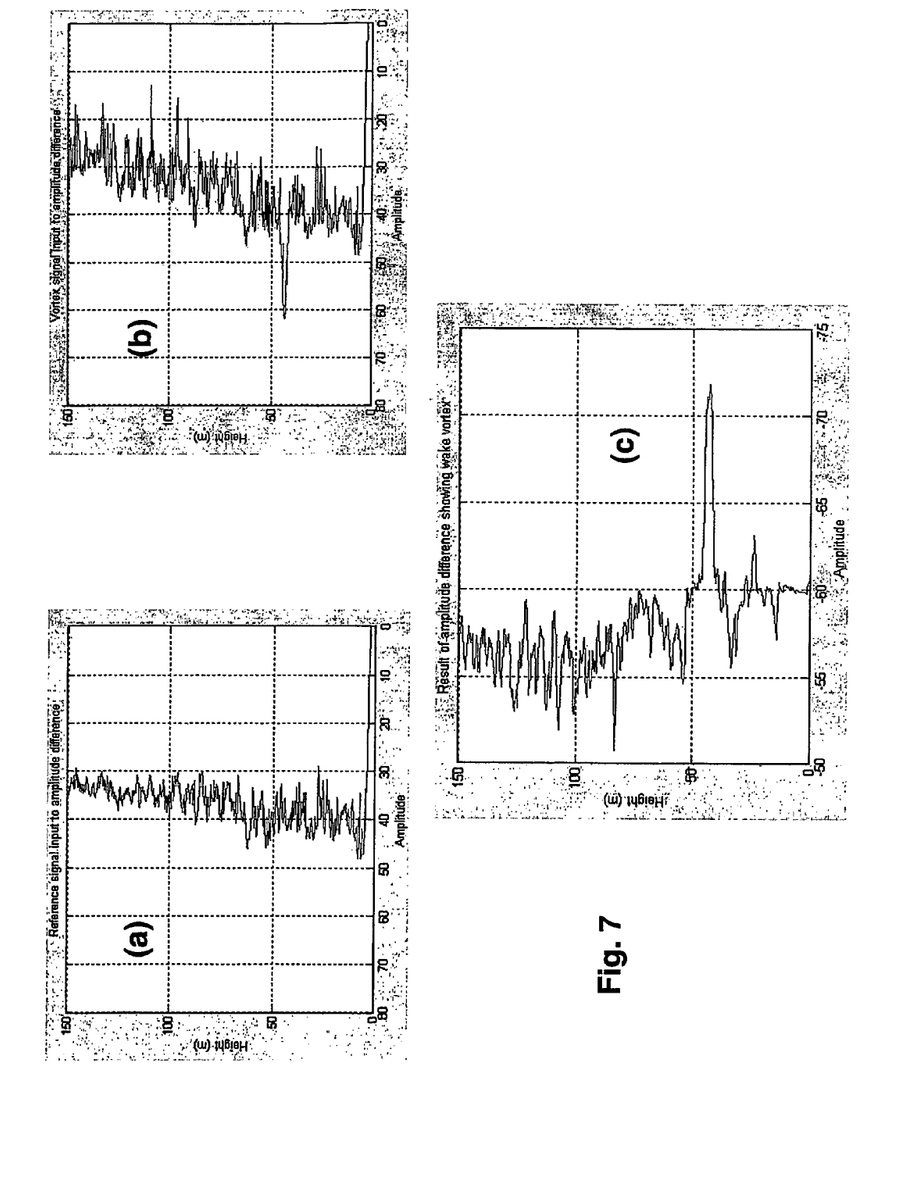

Despite the exceptional output of FIG. 5, it is normally quite difficult to discern a vortex with any confidence using only phase data from an active SODAR system alone; that is, without differencing with the reference phase and without cross-checking with the differenced amplitude outputs from active and reference data sets. FIGS. 6 and 7 show the type of phase and amplitude plots (datasets) much more commonly obtained. These plots were also obtained from a Boeing 737 at Melbourne airport, but on a day with about 8 knots of fairly gusty low-level wind. Plots (a), (b) and (c) of FIG. 6 are from phase data sets (digital sample streams) output on line 50 from reference matched filter 49, on line 45 from active matched filter 43, and on line 55 to analysis and display unit 54 (respectively), it being noted that plot (c) is the phase gradient of the difference output from unit 47. Though it appears likely that there is a vortex at about 40 m from plot (b) it required differencing with reference plot/dataset (a) and then differentiation in unit 53 to yield a confirmatory peak in plot (c) also at 40 m. By way of a cross-check, the amplitude plots of FIG. 7 parts (a), (b) and (c) were respectively derived from reference amplitude output dataset on line 51 from reference matched filter 49, active amplitude dataset output on line 46 from active matched filter 43 and the differenced dataset on line 56. The obvious coincidence of the strong peak at 40 m in differenced amplitude plot (c) of FIG. 7 with the strong gradient peak of differenced phase plot (c) in FIG. 6 provides strong confirmation of the presence of a significant vortex at 40 m. Features of this vortex can also be derived by inspection and calculation from these plots.

Figure 8:
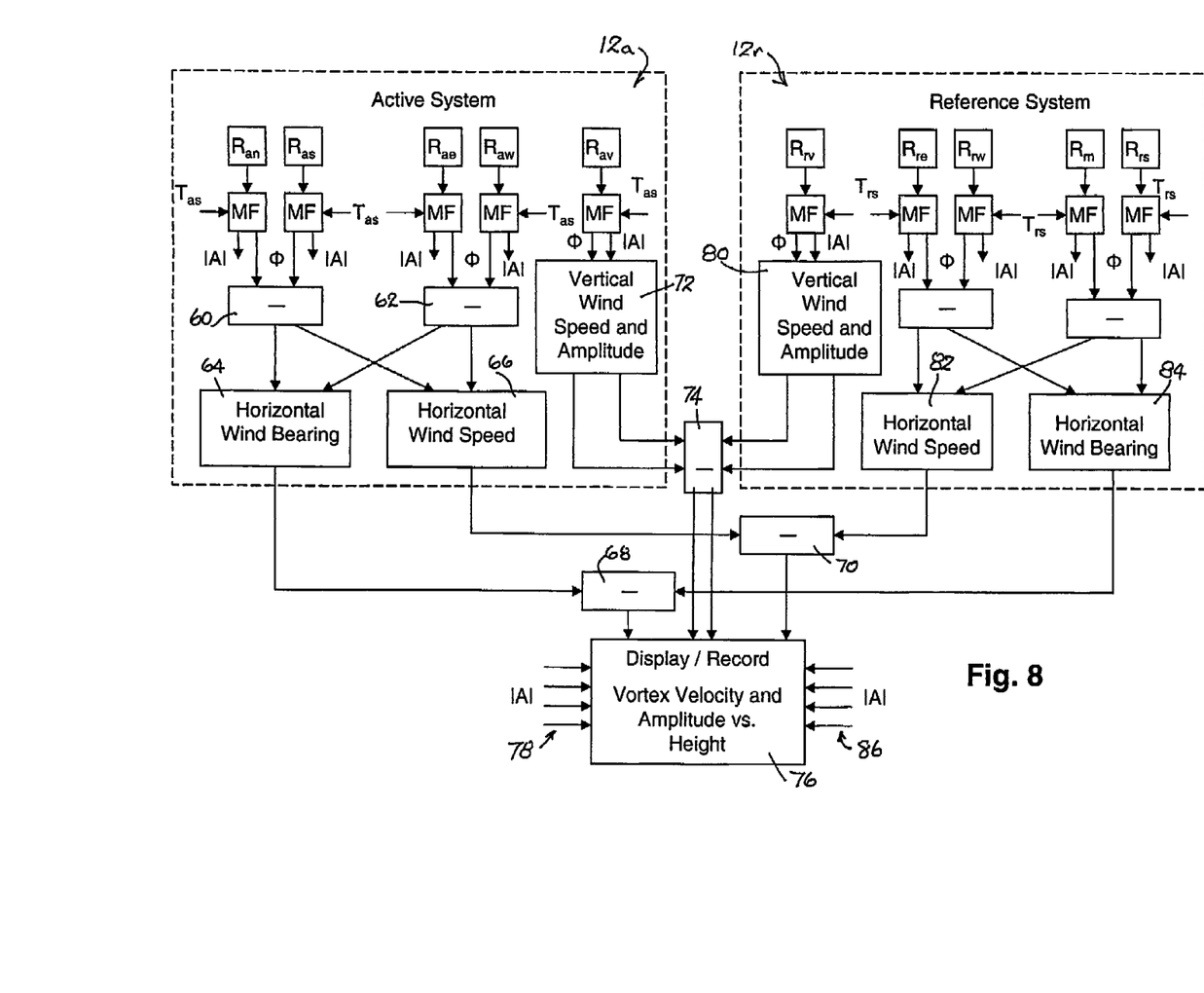
FIG. 8 is a block diagram of two SODAR systems similar to those of FIG. 3 but in which the outputs of five receivers in each system are utilized.

A matter of interest in the investigation of wake vortices is their duration, drift, sink-rate and decay with respect to time. This can be achieved by utilizing the other receivers of the active and reference SODAR systems shown in FIG. 3 in the manner taught in general terms in our prior patents. FIG. 8 therefore shows the system of FIG. 3 in a different perspective with this objective in mind. The output of each receiver of each SODAR system 12a and 12r is assumed to be sampled and digitized, the same sample rate being used for all receivers (and for the transmitted chirps) so that the same number of samples are generated by each receiver in each system. It will be convenient to assume the same pulse length of 1.5 s, the same listening time of 2.5 s and the same sample rate of 96 kHz as in FIG. 3. This yields a stream of 240,000 samples from each receiver in each interrogation cycle.

In order to extract the desired chirp echoes from noise and the direct transmitter signal, each receiver sample stream (or dataset) is fed to a matched filter MF along with a noise-free sample stream Tas representing the 1.5 s transmitted pulse (sampled at the same 96 kHz rate), the overlap of 1.0 s being padded out with zeros. In FIG. 8, the matched filters are indicated at MF, the sampled active transmitted signal is indicated at Tas and the sampled transmitted reference signal is indicated at Trs. Preferably, matched filters MF employ Fourier techniques and the echo identification and extraction occurs in the Fourier or frequency domain, the outputs from each matched filter preferably being a 96 kHz sample stream (dataset) indicative of the phase [Φ] of the echo signals and a 96 Khz sample stream (dataset) indicative of the amplitudes [|A|] of the echo signals. In order to measure horizontal wind speed and bearing it is desirable (as taught in our prior patent applications) to remove phase (or Doppler) components due to vertical wind.

Thus, in active SODAR system 12a, this is conveniently done by differencing the extracted north and south phase signals in unit or function 60, separately differencing the east and west phase signals in unit or function 62 and using the results to separately compute horizontal wind bearing and speed in units or functions 64 and 66 in the manner taught in our prior patent applications. These wind parameters of active system 12a will, of course, include components due to vortices and components due to prevailing winds and ambient conditions. Accordingly, the horizontal wind bearing dataset from unit 64 is fed to differencing unit or function 68 and the horizontal wind speed dataset from unit 66 is fed to differencing unit or function 70. The amplitude and phase outputs of vertical receiver Rav signify vertical wind speed and the amplitude of echoes returned vertically from both vortices and ambient wind, as indicated at 72, these phase and amplitude outputs being fed to a differencing unit or function 74. The four amplitude signal outputs of the matched filters connected to receivers Ran, Ras, Rae and Raw are fed directly as inputs to the analysis, display and/or record unit or function 76, as indicated by arrows 78.

Reference SODAR system 12r is substantially identical to and operates in exactly the same manner as just described for active system 12a, the only difference being that echoes due to vortices will not be present in the inputs to the five receivers of system 12r. Thus, datasets including the vertical wind speed and amplitude components (indicated at 80) are fed to differencing unit 74, the computed reference horizontal wind speed dataset at unit 82 is fed to differencing unit 70 and the reference horizontal wind bearing dataset at unit 84 is fed to differencing unit 68. And, the amplitude components from the matched filters MF connected to reference receivers Rrn, Rrs, Rre, and Rrw are fed direct to display unit 78, as indicated by arrows 86. Of course, the datasets resulting from the differencing operations in units 68, 70 and 74 are also fed to unit 78.

As taught in our prior applications, the vertical wind speed in each system 12a and 12r can be approximated by processing the north, south, east and west signals instead of employing separate vertical receivers Rav and Rrv. However, the use of dedicated vertical receivers is preferred. It will be appreciated that the computations involved in generating datasets indicative of wind bearing, wind speed and echo amplitude need not occur for each and every sample in each dataset because, as is common in the art, a fixed number of adjacent samples may be 'binned' or averaged to reduce the computational load.

It will also be appreciated that, as an alternative, the respective extracted signals from corresponding active and reference receivers could be differenced after the matched filters MF, rather than after determination of wind speed and bearing. However, this is somewhat more computationally demanding. While it is also envisaged that the unprocessed receiver outputs of the active and reference systems could be differenced, this is less desirable as it tends to degrade s/n. As already indicated in the discussion of FIG. 3, the three dimensional wind velocity vector with respect to height can be computed separately in the active and reference systems and these vectors can then be differenced in accordance with the principle of the present invention. The desirability of doing this will depend upon the amount of inaccuracy introduced in separately computing the vectors.

It will be appreciated that the blocks of FIGS. 3 and 8 need not represent separate physical items and may be simply indicative of functions performed by a single system or computer. For example, (as already noted) separate reference and active systems are not essential provided clear air exists between large aircraft landings so that a reference reading by the SODAR system can be taken. Such a combined system might therefore simply comprise a single set of four or five receivers and one transmitter coupled to a single portable computer with an inbuilt display and sound card. On the other hand, the I/O and processing demands placed on a single computer will be very great if near-realtime operation is expected. Each receiver and its associated transmitter may therefore have its own dedicated PC and sound card, these PCs being networked with a separate system and display PC for each SODAR system (12a and 12r) and the latter PCs being connected, in turn, to a differencing and net-display PC. Finally, as already discussed above, the differencing function can be effected at various steps in the processing of the received signals.

Figure 9:
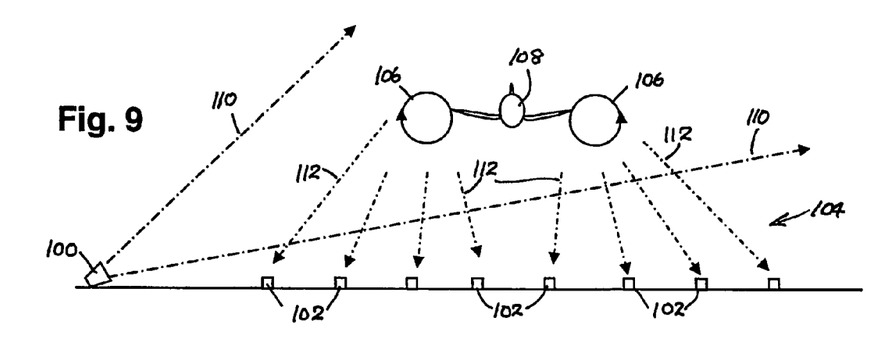
FIG. 9 is a diagrammatic a transverse view of a flight path near a runway with a landing aircraft where a row of receivers is arranged across the flight path to serve as a synthetic aperture.
Figure 10:
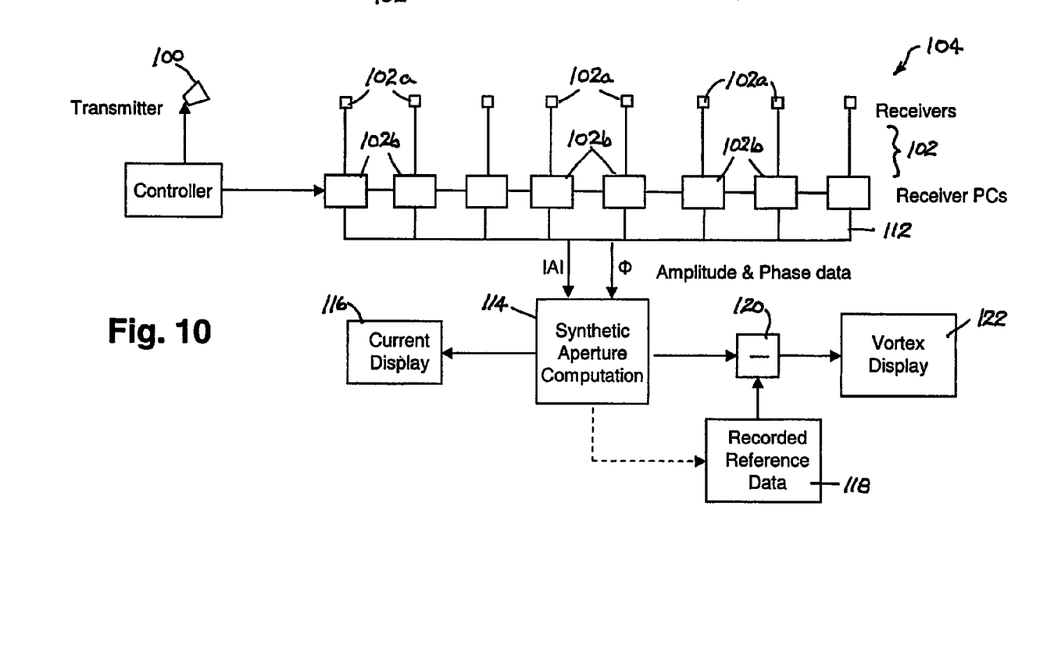
FIG. 10 is a block diagram showing the receivers of FIG. 9 incorporated in a synthetic aperture system.

FIGS. 9 and 10 illustrate an alternative arrangement in which a SODAR transmitter 100 and a row or array of relatively remote SODAR receivers 102 are arranged and combined to form a synthetic aperture SODAR system 104 to visualize vortices 106 shed from an approaching aircraft 108. Transmitter 100 is arranged to one side of the flight path to illuminate a volume of air, indicated by broken lines 110, where vortices of concern are likely to occur. Echoes 112 of transmitted chirped pulses reflected or scattered from vortices 106 and from wind ducts (not shown) are detected and partially processed by receivers 102. In this system, soundings are undertaken during quite or normal times between the landing of aircraft and this reference sounding data is recorded for subsequent subtraction from active data obtained during the landing or approach of aircraft 108.

Because of the computational load in such systems, it will generally be more practical for each receiver 102 to comprise a microphone 102a connected to its own computer 102b (FIG. 10), each computer 102b outputting amplitude and phase data sample streams via a LAN 112 to a synthetic aperture computer 114 that generates a display 116. Synthetic aperture computer 114 is also connected to a recorder or memory 118 that stores reference 'scenes' or data for later use. As already noted, such reference data is recorded during quite periods between aircraft landings. Display 116 shows the current output of computer 114, whether it be the reference scene (duct data alone) or the 'gross' scene (vortex and duct data combined). The gross output from processor 114 is fed to a differencing unit or process 120 in which the reference data is extracted and the net result is then displayed in vortex display unit 122. It will be appreciated by those skilled in the art that displays 116 and 122 may be one and the same, since this can be accomplished by appropriate signal selection or switching.

It will be appreciated that, while examples of SODAR systems capable detecting and characterizing low altitude vortices have been described that offer unique value, many modifications to the systems of these examples, and many other examples may be devised, without departing from the scope of the following claims. The operation of the SODAR system of the examples can be made automatic by employing one or more of the receiver microphones to detect the approach or takeoff of an aircraft and to initiate active data acquisition and to detect the absence of aircraft to initiate reference data acquisition.

It will also be appreciated that the invention can be used to characterize many other low altitude atmosphere turbulences and, for that purpose, the system transmitter and one or more receivers may be mounted on a portable and steerable structure. This could allow such systems to be used indoors to identify and track eddies, dead-spots and vortices caused by air conditioning systems, for example.

The invention claimed is:

1. A SODAR method of detecting and/or quantifying short-duration near-ground target turbulence in a volume of air comprising the steps of:
    transmitting a first acoustic chirp into said volume when or where the target turbulence is absent,
    detecting echoes of said first chirp to thereby generate a reference dataset indicative of prevailing ambient conditions in said volume of air,
    transmitting a second acoustic chirp into said volume when or where the target turbulence is present,
    detecting echoes of said second chirp to thereby generate an active dataset indicative both of said prevailing ambient conditions and of said target turbulence, and
    differencing said reference and said active datasets to generate a net dataset indicative of the target turbulence with the effect of said prevailing conditions reduced.

2. A SODAR method according to claim 1 including the steps of:
    transmitting each of said first and second acoustic chirps for substantially identical durations of between 300 ms and 3 s,
    employing matched filter techniques to extract phase and amplitude data arising from acoustic echoes of the first chirp returned from said air volume during a first listening time, which comprises substantially the duration of the respective chirp and an additional contiguous period that is shorter than the duration of the respective chirp, to thereby generate said reference dataset,
    employing matched filter techniques to extract phase and amplitude data arising from acoustic echoes of the second chirp returned from said air volume during a second listening time, which is of substantially the same duration as the first listening time, to thereby generate said active dataset, and
    visually plotting or tabulating the net dataset, or selecting portions thereof, with respect to said second listening time to depict or represent the target turbulence.

3. A SODAR method according to claim 2 wherein an acoustic transmitter is employed to generate said second chirp and plurality of acoustic receivers are arranged equidistant around the transmitter, each receiver is arranged to receive and detect echoes from each second chirp transmitted by the transmitter, and said matched filter techniques are used to extract phase and amplitude data from echo signals received by each receiver, the method including the step of differencing the phase and amplitude data extracted from the plurality of receivers so as to indicate the horizontal and/or vertical movement of the target turbulence within the volume of air.

4. A SODAR method according to claim 2 wherein four receivers are arranged in quadrature around the transmitter and equally spaced therefrom, a first pair of receivers being arranged on a first axis passing through the transmitter and a second pair of receivers being arranged on a second axis passing through the transmitter, the method including the steps of:
   differencing the phase outputs extracted from the first pair of receivers to derive a first velocity dataset indicative of the speed of movement of the target turbulence along said first axis, and
   differencing the phase outputs extracted from the second pair of receivers to derive a second velocity dataset indicative of the speed of movement of the target turbulence along said second axis.

5. A SODAR method according to claim 4 including the step of combining the first and second velocity datasets to generate a bearing dataset indicative of the azimuth bearing of the movement of the target turbulence with respect to the transmitter.

6. A SODAR method according to claim 1 wherein the volume of air is near an airport runway, landing approach or takeoff path and between the ground and an altitude of 300 m, wherein the target turbulence is wake vortices shed by large aircraft and wherein the chirp or chirps are transmitted substantially vertically.

7. A SODAR method according to claim 3 including the steps of:
   separately differencing the phase and amplitude components of the active and reference datasets to generate separate net phase dataset and a separate amplitude net dataset.

8. A SODAR system according to claim 7 including the steps of:
   differentiating, or determining the gradient, of the net phase dataset to accentuate the presence of vortex-like target turbulences having closely spaced but opposite wind speeds.

9. A SODAR method of detecting and/or quantifying short-duration near-ground target turbulence in a volume of air comprising the steps of:
   transmitting a first acoustic chirp having a duration of between 300 ms and 3 s into said volume,
   employing matched filter techniques to extract phase and amplitude data arising from acoustic echoes of said first chirp returned from said air volume during a first listening time comprising transmission of said first chirp plus a contiguous period of time thereafter that is shorter than the duration of the chirp, said extracted phase and amplitude data forming an active dataset indicative of both the target disturbance and prevailing ambient conditions within the volume of air, and
   plotting or tabulating the variation of said active dataset with respect to said listening time to depict or represent such turbulence.

10. A SODAR method according to claim 9 including the steps of:
    transmitting a second acoustic chirp that is substantially identical to the first acoustic chirp into said volume when or where the target turbulence is absent,
    employing matched filter techniques to extract phase and amplitude data arising from acoustic echoes of said second chirp returned from said air volume during a second listening time, which is of substantially the same duration as the first listening time, to thereby generate a reference dataset indicative of the prevailing ambient conditions alone, and
    differencing said reference and said active datasets to generate a net dataset indicative of the target turbulence with the effect of said prevailing conditions reduced.

11. A SODAR method according to claim 10 wherein an acoustic transmitter is employed to generate said first chirp and a plurality of acoustic receivers are arranged equidistant around the transmitter, each receiver is arranged to receive and detect echoes from each second chirp transmitted by the transmitter, and said matched filter techniques are used to extract phase and amplitude data from echo signals received by each receiver, the method including the step of differencing the phase and amplitude data extracted from the plurality of receivers so as to indicate the horizontal and/or vertical movement of the target turbulence within the volume of air.

12. A SODAR method of detecting and/or quantifying short-duration near-ground target turbulence in a volume of air in an airport landing approach or takeoff path below an altitude of 300 m, the method comprising the steps of:
    transmitting a first acoustic chirp upwardly at an acute angle of elevation by a transmitter located on one side of the path in order to acoustically illuminate a target turbulence along with prevailing wind conditions in the volume of air,
    detecting acoustic echoes of the chirp returned from the volume of air by each of a plurality of receivers spaced apart across the path,
    extracting a first set of phase and/or amplitude data from each receiver using matched filter techniques that reference the waveform of the transmitter chirp, and
    employing the first set of extracted data to general an active synthetic-aperture dataset indicative of the combined prevailing wind conditions and the target turbulence within the air volume.

13. A SODAR method according to claim 12 including the steps of:
    in the absence of the target turbulence but with the presence of said prevailing wind conditions, transmitting a second acoustic chirp that is substantially identical to said first chirp upwardly at said acute angle of elevation in order to acoustically illuminate the volume of air,
    detecting acoustic echoes of said second chirp returned from the volume of air by each of a plurality of said receivers,
    extracting a second set of phase and/or amplitude data from each receiver using matched filter techniques that reference the waveform of the transmitter chirp,
    employing said second set of extracted data to generate a reference synthetic-aperture dataset indicative of the prevailing wind conditions within the air volume, and
    differencing the extracted first and second sets of phase and/or amplitude data to, or differencing said active and reference synthetic-aperture datasets to indicate the target turbulence with the prevailing wind conditions absent or attenuated.

14. A SODAR system for use in detecting and/or quantifying short-duration near-ground target turbulence in a volume of air, the system comprising:

acoustic transmitter means adapted to direct acoustic chirps into said volume to generate a first set of chirp echoes from prevailing wind conditions and from target turbulence within said volume and a second set of substantially identical acoustic chirps into the volume to generate a second set of chirp echoes from the prevailing wind conditions in the absence of the target turbulence, acoustic receiver means located to receive said first and second series of echoes and to generate an active dataset indicative of said prevailing conditions and turbulence and a reference dataset indicative of the prevailing conditions alone, differencing means adapted to difference said active and reference datasets to generate a net dataset that is representative of the target turbulence without the prevailing wind conditions, or at least with the effect of such conditions mitigated.

15. A SODAR system according to claim 14 wherein:

said transmitter means is adapted to generate chirps having durations between 300 ms and 3 s, a matched filter is arranged to receive output from said receiver means and to extract phase and/or amplitude data therefrom, said active and said reference datasets including such phase and/or amplitude information, and said differencing means being arranged to receive said active and reference data sets and to separately difference the amplitude components and the phase components thereof to generate said net dataset.

16. A SODAR system according to claim 14 wherein:

said transmitter means comprises a first transmitter and a second transmitter spaced sufficiently apart so that a single target turbulence will not be illuminated by chirps transmitted by both transmitters but sufficiently close that the prevailing wind conditions will be common, said receiver means comprises a first receiver assembly located near the first transmitter for receiving said first series of echoes from chirps, which are transmitted by said first transmitter, the active dataset being generated from the output of the first receiver assembly, said receiver means also comprises a second receiver assembly near the second transmitter for receiving said second series of echoes, which are transmitted by said second transmitter, the second dataset being generated from the output of the second receiver assembly.

17. A SODAR system according to claim 16 wherein:

said first receiver assembly comprises four individual first receivers located equidistant and in quadrature around the first transmitter to form two pairs of opposed first receivers, each of said first receivers outputs to an active matched filter adapted to extract phase data in the echoes received by the respective first receiver, first differencing means are connected to said active matched filters and adapted to difference phase data extracted thereby to generated differenced phase data indicative of the bearing and horizontal velocity of air movement within the air volume illuminated by the chirps of the first transmitter, said second receiver assembly comprises four individual second receivers located equidistant an din quadrature around the second transmitter to form two pairs of opposed second receivers, each of said second receivers outputs to a reference matched filter adapted to extract phase data in the echoes received by the respective second receiver, and second differencing means are connected to said reference matched filters and adapted to difference phase data extracted thereby to generate differenced phase data indicative of the bearing and horizontal velocity of air movement within the air volume illuminated by the chirps of the first transmitter.

18. A SODAR system according to claim 14 wherein:

said transmitter means comprises a single transmitter, said receiver means comprises four acoustic receivers arranged in quadrature around and equidistant from the transmitter, said receivers being arranged in two opposed pairs, each of said receivers outputs to a matched filter adapted to extract phase data in the echoes received by that receiver, and differencing means connected to said matched filters and adapted to difference phase data extracted therefrom to generate differenced phase data indicative of the bearing and horizontal velocity of air movement within the air volume illuminated by the chirps of the transmitter.

19. A SODAR system for use in detecting and/or quantifying short-duration near-ground target turbulence in a volume of air, the system comprising:

acoustic transmitter means adapted to direct acoustic chirps into said volume at an acute angle of elevation to generate a first set of chirp echoes from prevailing wind conditions and from target turbulence within said volume and to generate a second set of substantially identical acoustic chirps into the volume to generate a second set of chirp echoes from the prevailing wind conditions in the absence of the target turbulence, a plurality of acoustic receivers arranged in a row extending from said transmitter means, said receivers being located to receive said first and second series of echoes and to generate an active dataset indicative of said prevailing conditions and turbulence and a reference dataset indicative of the prevailing conditions alone, means for accepting said active dataset and adapted to transform the same into an active synthetic aperture image of the combined prevailing conditions and turbulence, means for accepting said reference dataset and adapted to transform the same into a reference synthetic aperture image of the prevailing conditions in the absence of the target turbulence, and differencing means adapted to difference said active and reference synthetic aperture images to generate a net dataset and a net synthetic aperture image that is representative of the target turbulence without the prevailing wind conditions, or at least with the effect of such prevailing conditions mitigated.

* * * * *